United States Patent
Sakashita

(10) Patent No.: US 9,041,952 B2
(45) Date of Patent: May 26, 2015

(54) INPUT DEVICE, IMAGE READING DEVICE, AND IMAGE FORMING APPARATUS TO AUTHENTICATE THE USER BASED ON A RESULT RECEIVED BY INPUT SECTION

(71) Applicant: KYOCERA Document Solutions Inc., Osaka (JP)

(72) Inventor: Fumiya Sakashita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/309,085

(22) Filed: Jun. 19, 2014

(65) Prior Publication Data

US 2014/0376030 A1    Dec. 25, 2014

(30) Foreign Application Priority Data

Jun. 25, 2013    (JP) .................. 2013-132989

(51) Int. Cl.
    H04N 1/44    (2006.01)
    H04N 1/00    (2006.01)
(52) U.S. Cl.
    CPC ......... *H04N 1/4413* (2013.01); *H04N 1/00838* (2013.01)
(58) Field of Classification Search
    CPC .................. H04N 1/4413; H04N 1/00838
    USPC ........................................... 358/1.14
    See application file for complete search history.

(56) References Cited

U.S. PATENT DOCUMENTS

| | | | | |
|---|---|---|---|---|
| 2011/0247067 A1* | 10/2011 | Hirose | ............. | 726/19 |
| 2014/0055235 A1* | 2/2014 | Choi | ............. | 340/5.28 |
| 2014/0211240 A1* | 7/2014 | Maki | ............. | 358/1.14 |
| 2014/0218304 A1* | 8/2014 | Chen et al. | ............. | 345/169 |

FOREIGN PATENT DOCUMENTS

JP    2000-099801 A    4/2000

* cited by examiner

*Primary Examiner* — Qian Yang
(74) *Attorney, Agent, or Firm* — Studebaker & Brackett PC

(57) ABSTRACT

An input device includes a display section, an input section, and an authentication section. The display section has a display area and displays a plurality of symbols in respective first regions of the display area. The input section receives an input indicating which of the plurality of symbols displayed on the display section is selected by a user by specifying a position in the display area. The authentication section authenticates the user based a result received by the input section. The input section receives an input indicating which of the plurality of symbols is selected, by receiving an input indicating which of a plurality of second regions allocated to each first region is selected. The authentication section authenticates the user based on the first region corresponding to the selected symbol from among the plurality of first regions and the second region selected from among the plurality of second regions.

10 Claims, 9 Drawing Sheets

INPUT DEVICE, IMAGE READING DEVICE, AND IMAGE FORMING APPARATUS TO AUTHENTICATE THE USER BASED ON A RESULT RECEIVED BY INPUT SECTION

INCORPORATION BY REFERENCE

The present application claims priority under 35 U.S.C. §119 to Japanese Patent Application No. 2013-132989, filed Jun. 25, 2013. The contents of this application are incorporated herein by reference in their entirety.

BACKGROUND

The present disclosure relates to input devices, image reading devices, and image forming apparatuses.

Some image forming apparatuses perform authentication of a user with a personal identification number input by the user when the user executes copying or scanning. Image forming apparatuses are often installed at a location exposed to many eyes. Therefore, the risk is high that the personal identification number is revealed by a third party from the hand movement for entering the personal identification number. To reduce the risk of the personal identification number being revealed by a third party, some devices for inputting personal identification numbers randomly alter the display positions of the numeric keys of a ten-keypad on the input screen.

SUMMARY

An input device according to the present disclosure includes a display section, an input section, and an authentication section. The display section includes a display area. The display section displays a plurality of symbols in respective first regions of the display area. The input section receives an input indicating which of the plurality of symbols displayed on the display section is selected by a user by specifying a position in the display area. The authentication section authenticates the user based on a result received by the input section. The input section receives the input indicating which of the plurality of symbols displayed on the display section is selected, by receiving an input indicating which of a plurality of second regions allocated to each of the first regions is selected. The authentication section authenticates the user based on the first region corresponding to the selected symbol from among the plurality of first regions and the second region selected from among the plurality of the second regions.

An image reading device according to the present disclosure includes the above-described input device and an image reading section. The image reading section reads an image of an original document.

An image forming apparatus according to the present disclosure includes the above-described image reading device and an image forming section. The image forming section forms an image based on image data read by the image reading device.

DETAILED DESCRIPTION

The following describes embodiments directed to an input device, an image reading device, and an image forming apparatus each according to the present disclosure with reference to the accompanying drawings. However, the present disclosure is not limited to the specific embodiments described below.

Figure 1A:
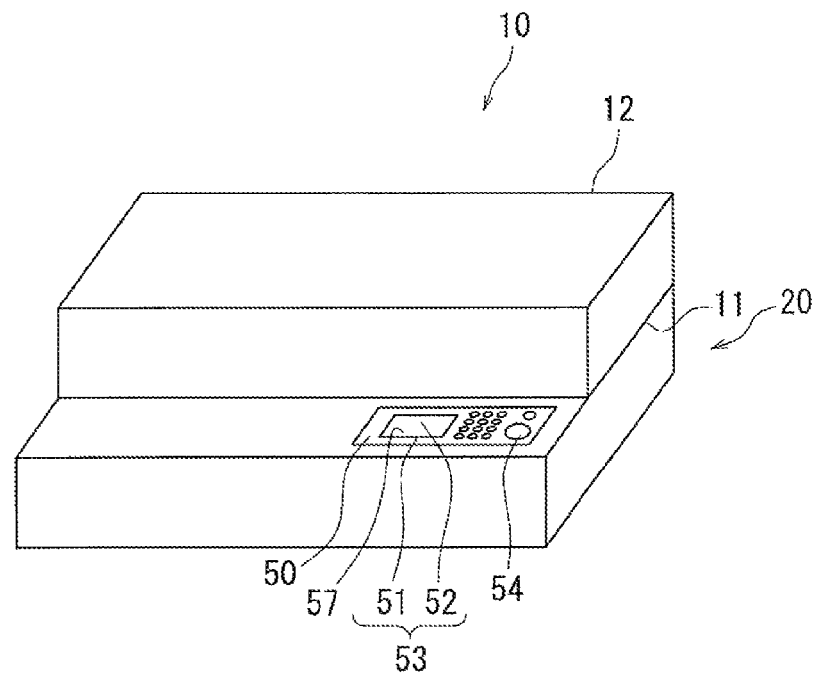
FIG. 1A is an oblique view schematically showing an image reading device according to an embodiment of the present disclosure.
Figure 1B:
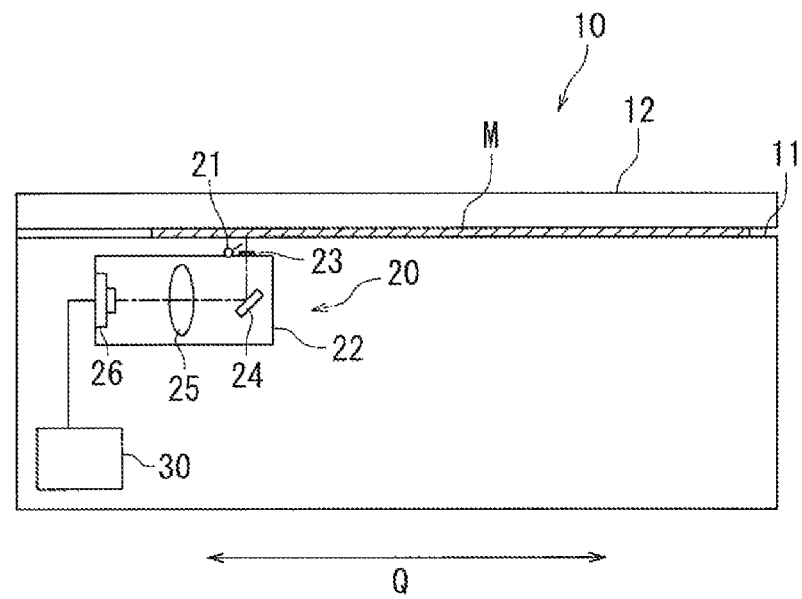
FIG. 1B is a perspective side view schematically showing the image reading device according to the embodiment of the present disclosure.

The following describes an embodiment directed to an image reading device 10 according to the present disclosure, with reference to FIGS. 1A and 1B. FIG. 1A is an oblique view schematically showing the image reading device 10 according to the embodiment of the present disclosure. FIG. 1B is a side view schematically showing the image reading device 10 according to the embodiment of the present disclosure.

The image reading device 10 includes an input device 50 and an image reading section 20. Typically, the image reading device 10 further includes a document table 11 and a document cover 12. The image reading device 10 reads an original document M placed on the document table 11 to obtain an input image. In one example, the image reading device 10 is a scanner. In one example, the original document M is paper but not limited to paper. The original document M may be cloth or a three-dimensional object with a thickness, for example.

The input device 50 includes a touch panel 53 and an operating button 54. The touch panel 53 includes a display section (liquid crystal panel) 51 and an input section (touch sensor) 52. The display section 51 has a display area 57. The operating button 54 includes a numeric keypad, a start button, and the like. At a push of the touch panel 53 or the operating button 54 by the user, the image reading device 10 starts reading an image of the original document M.

Next, the following describes an image reading operation of the image reading device 10, with reference to FIG. 1B. The image reading device 10 includes a movable unit (carriage) 22 that moves below the document table 11. The document table 11 is transparent, for example, and made from glass. A light source 21, a reflecting mirror 24, a lens 25, and an image pickup section 26 are attached to the movable unit 22. The movable unit 22 is provided with a slit 23 on its upper surface. The movable unit 22 is movable relatively to the original document M in a movement direction Q together with the light source 21, the reflecting mirror 24, the lens 25, and the image pickup section 26.

The following describes the process in which light emitted from the light source 21 reaches the image pickup section 26. The light source 21 illuminates the document table 11 from below. Light emitted from the light source 21 is reflected by the original document M and passes through the slit 23 to reach the reflecting mirror 24. The light having reached the reflecting mirror 24 is reflected by the reflecting mirror 24 and passes through the lens 25 to reach the image pickup section 26.

The image pickup section 26 is a charge coupled device (CCD) sensor, for example. The image pickup section 26 acquires scan data of the original document M in an analog signal line by line from light having reached the image pickup section 26. Subsequently, the scan data is converted from the analog signal to a digital signal by an analog front end (AFE) (not shown). The image data in the resulting digital signal is input to a control section 30.

The control section 30 controls the light source 21 and the image pickup section 26. The control section 30 includes, for example, an application specific integrated circuit (ASIC), a central processing unit (CPU), a read only memory (ROM), and a random access memory (RAM).

Figure 2:
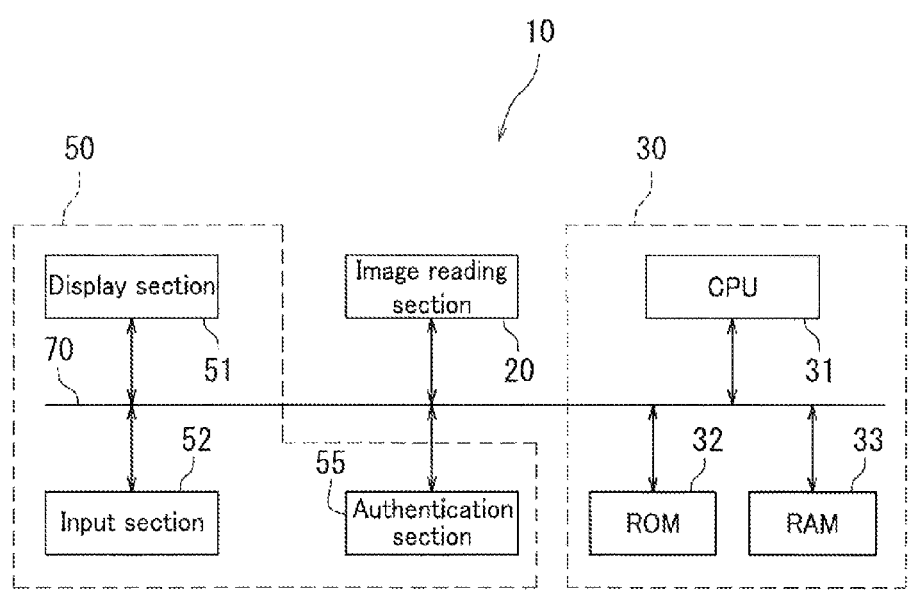
FIG. 2 is a block diagram of the image reading device according to the embodiment of the present disclosure.

The following describes the embodiment directed to the image reading device 10 according to the present disclosure, with reference to FIG. 2. FIG. 2 is a block diagram of the image reading device 10 according to the embodiment of the present disclosure. The image reading device 10 includes the input device 50, the image reading section 20, and the control section 30. The input device 50 includes the display section 51, the input section 52, and an authentication section 55. The display section 51, the input section 52, the authentication section 55, the image reading section 20, CPU 31, ROM 32, and RAM 33 are all connected through a bus 70.

The display section 51 includes the display area 57. The display section 51 displays symbols in the display area 57, and each symbol displayed is a candidate for input of authentication information. In one example, authentication information is a four-digit personal identification number. In the case where the authentication information is a personal identification number, numerals are the symbols being candidates for input of authentication information. The display section 51 displays an on-screen numeric keypad that includes numerals 0 to 9, for example. The authentication information is stored in the ROM 32.

The input section 52 receives information input by the user. For example, the input section 52 receives a four-digit number input by the user. In the following description in the present specification, the information received by the input section 52 is referred to as receipt information. The receipt information is stored in the RAM 33.

The authentication section 55 authenticates the user based on the result received by the input section 52. In other words, the authentication section 55 authenticates the user depending on whether the receipt information matches the authentication information (personal identification number).

After the image reading device 10 authenticates the user depending on whether the receipt information matches the authentication information (personal identification number), the successfully authenticated user is permitted to use various functions including the above-described function of reading an image of the original document M. In the following description of the present specification, the respective functions including the function of reading the original document M are referred to as normal functions.

The image reading device 10 has functions available only to the administrative user (for example, changing the settings of the image reading device 10), and use of such a function requires the user authentication by the authentication section 55 based on authentication information that includes the touch position in addition to the personal identification number. The successfully authenticated user is permitted to use the functions available only to the administrative user. In the following description of the present specification, the functions available only to the administrative user are referred to as limited functions.

Figure 3A:
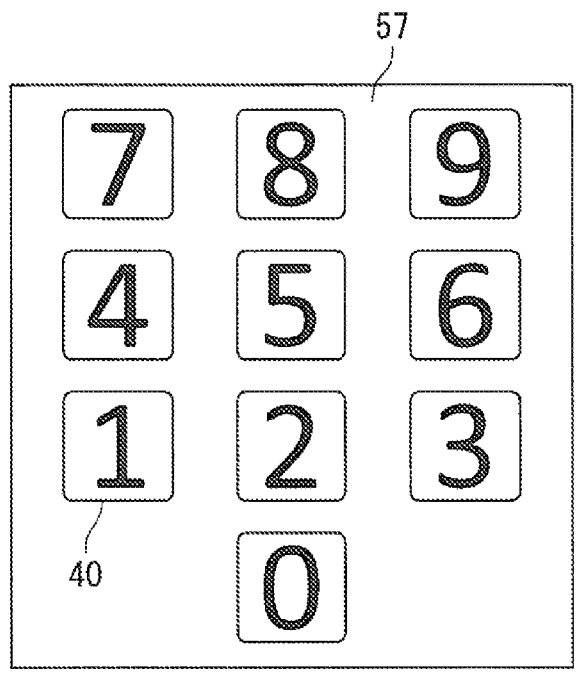
FIG. 3A is a schematic view showing a display section of an input device according to the embodiment of the present disclosure.
Figure 3B:
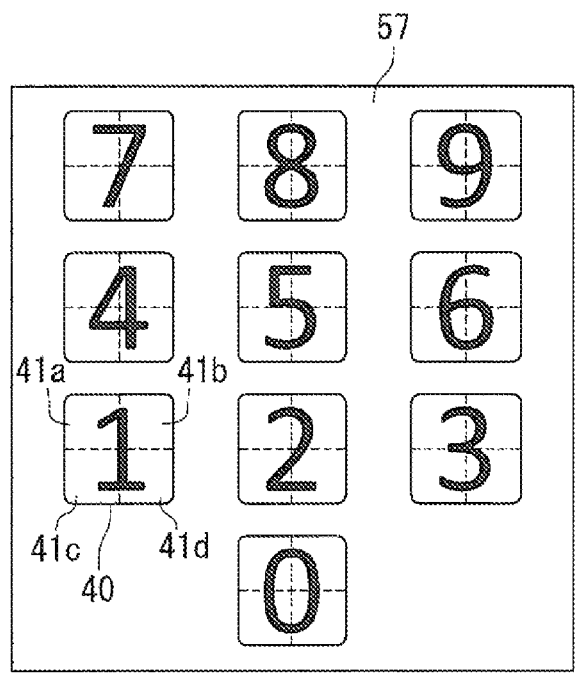
FIG. 3B is a schematic view showing the display section of the input device according to the embodiment of the present disclosure.

The following describes an embodiment directed to the input device 50 according to the present disclosure with reference to FIGS. 3A and 3B. FIG. 3A is a schematic illustration showing the display section 51 of the input device 50 according to the embodiment of the present disclosure. FIG. 3B is another schematic illustration showing the display section 51 of the input device 50 according to the embodiment of the present disclosure.

First, the user authentication for the use of a normal function is described with reference to FIG. 3A. The display section 51 displays a plurality of first regions 40 in the display area 57. The display section 51 displays a plurality of symbols (numerals 0 to 9) in the respective first regions 40. Each first region 40 is rectangular in shape.

The user specifies a position in the display area 57. In response, the input section 52 receives an input indicating which of the plurality of symbols displayed on the display section 51 is selected. The specification of the position in the display section 51 is made by a touch on the first region 40 by the user. For example, to input a four-digit number "0123", the user sequentially touches the first region 40 where the numeral "0" is displayed, the first region 40 where the numeral "1" is displayed, the first region 40 where the numeral "2" is displayed, and the first region 40 where the numeral "3" is displayed. The input section 52 sequentially receives inputs indicating the numerals selected according to the respective first regions that are specified by the user. The input section 52 sends the received result (receipt information "0123") to the RAM 33, and the RAM 33 stores the receipt information.

The authentication section 55 authenticates the user based on the result received by the input section 52. The authentication section 55 authenticates the user by determining whether or not the receipt information "0123" stored in the RAM 33 matches the authentication information "0123" stored in the ROM 32. Once authenticated by the authentication section 55, the user is permitted to use the normal functions of the image reading device 10.

When the administrative user uses the limited functions, the input device 50 authenticates the user based on the position of the touch by the user in each relevant first region 40 in which a numeral is displayed, in addition to the four-digit personal identification number. Next, the user authentication for the use of limited functions is described with reference to FIG. 3B. Each first region 40 is equally divided into four regions. Thus, each first region 40 includes second regions 41a, 41b, 41c, and 41d. Note that FIG. 3B shows dotted lines dividing each first region for the sake of convenience in illustration. However, no such lines are displayed on the actual screen.

When receiving an input indicating which of the plurality of symbols is selected, the input section 52 receives an input indicating which of the plurality of second regions allocated to each first region is selected. For example, when the user sequentially touches the upper-left second region in the first region where "0" is displayed, the upper-right second region in the first region where "1" is displayed, the lower-left second region in the first region where "2" is displayed, and the lower-right second region in the first region where "3" is displayed, the input section 52 receives information indicating "0—upper left, 1—upper right, 2—lower left, and 3—lower right" as reception inform.

The authentication section 55 authenticates the user based on the result received by the input section 52. The authentication section 55 authenticates the user by determining whether or not the reception information "0—upper left, 1—upper right, 2—lower left, and 3—lower right" matches the authentication information. In this way, the authentication section 55 authenticates the user by using the touch positions as the authentication information in addition to the personal identification number. Once authenticated by the authentication section 55, the administrative user is permitted to use the limited functions of the image reading device 10.

Figure 4:
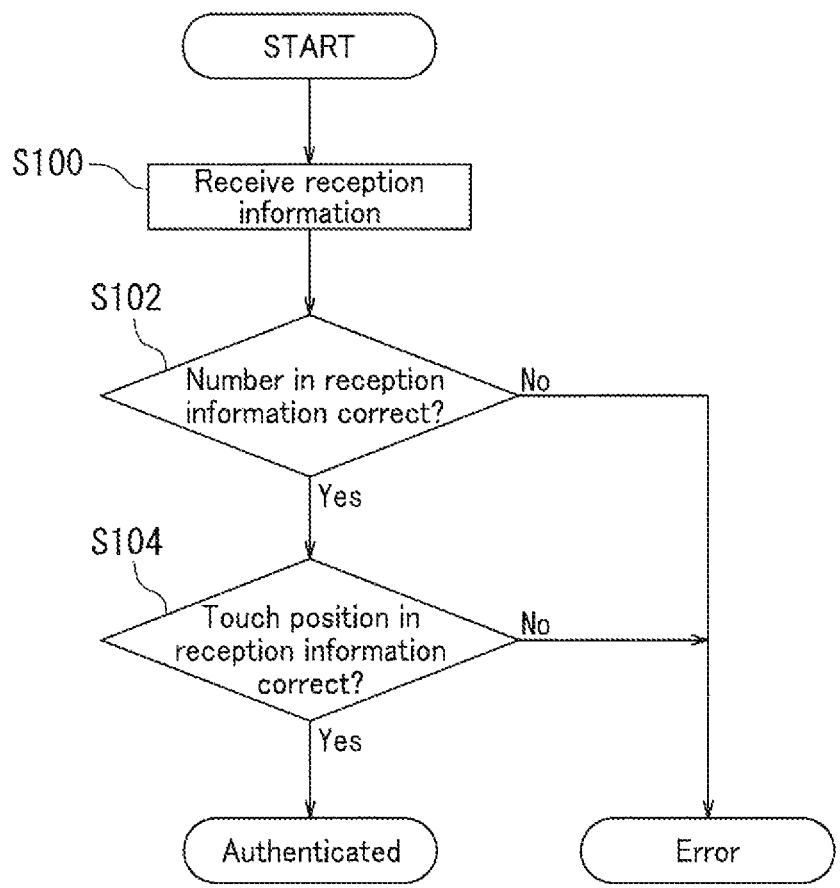
FIG. 4 is a flowchart illustrating an authentication method according to the present disclosure.

The following describes an embodiment directed to an authentication method performed by the image reading device 10 according to the present disclosure, with reference to FIG. 4. FIG. 4 is a flowchart illustrating the authentication method according to the present disclosure. As shown in FIG. 4, the authentication of a user is performed through Steps S100 to S104.

Step S100: The input section 52 receives reception information. For example, the input section 52 receives as the reception information a four-digit number selected by the user. The input section 52 further receives as the reception information the touch positions where the user touched.

Step S102: The authentication section 55 determines whether or not the number in the reception information is correct. More specifically, the authentication section 55 determines whether or not the number (numerals) received by the input section 52 matches the personal identification number. For example, it is determined whether or not the number "0123" in the reception information is correct. When the authentication section 55 determines that the number in the reception information is not correct (Step S102: No), the authentication of the user results in an error, and thus the user is not permitted to use the functions of the image reading device 10. When the authentication section 55 determines that the number in the reception information is correct (Step S102: Yes), the authentication method proceeds to Step S104.

Step S104: The authentication section 55 determines whether or not each of the touch positions in the reception information is correct. More specifically, the authentication section 55 determines whether or not each of the touch positions in the reception information is correct based on the second region selected from among the plurality of second regions. When the authentication section 55 determines that at least one of the touch positions in the reception information is not correct (Step S104: No), the authentication of the user results in an error and thus the user is not permitted to use the functions of the image reading device 10. When the authentication section 55 determines that all of the touch positions in the reception information are correct (Step S104: Yes), the user is permitted to use the functions of the image reading device 10.

In the authentication method descried above, the authentication section 55 makes the determination as to whether the number in the reception information is correct (Step S102) and the determination as to whether the touch positions in the reception information is correct (Step S104) in separate steps. However, Steps S102 and S104 may be performed at the same time.

As has been described with reference to FIGS. 1 to 4, the input section 52 of the input device 50 receives an input indicating which of the plurality of symbols is selected, by receiving an input indicating which of the plurality of second regions allocated to each first region 40 is selected. The authentication section 55 authenticates the user based on the first region corresponding to the selected symbol from among the plurality of first regions 40 and the second region selected from among the plurality of second regions (the second regions 41a, 41b, 41c, and 41d). In the eyes of the third party, it is not recognizable that second regions are selected for authentication. This can reduce the risk that the input procedure for authentication is revealed by the third party and thus reduce the risk of the usage by unauthorized users.

The plurality of second regions (second regions 41a, 41b, 41c, and 41d) allocated to each first region 40 are equally divided regions of the first region 40. Therefore, when specifying a second region with a touch, the user can easily recognize the boundaries between the second regions.

Figure 5:
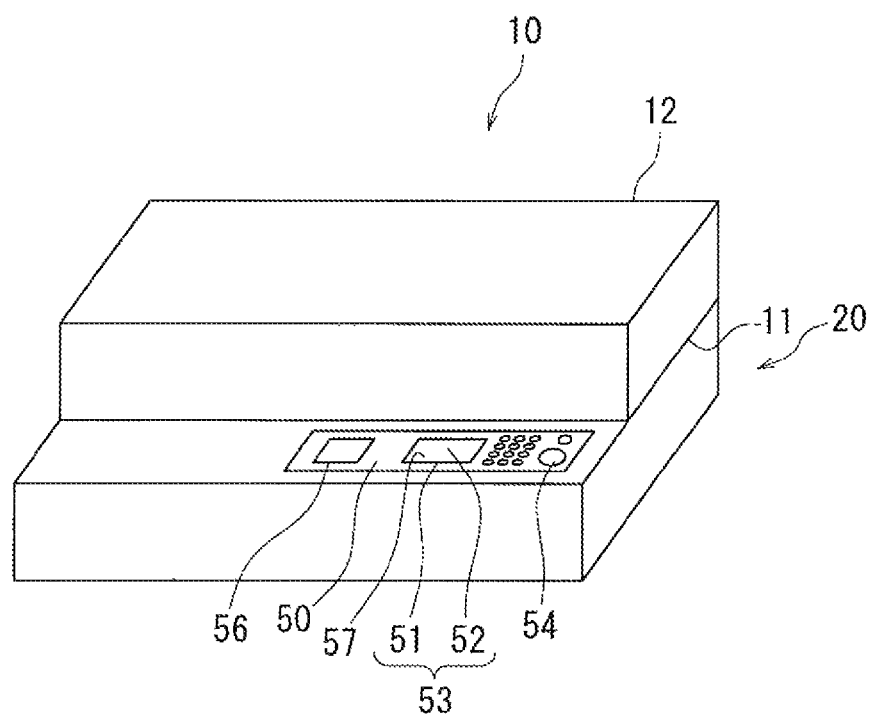
FIG. 5 is an oblique view schematically showing an image reading device according to an embodiment of the present disclosure.

The following describes an embodiment directed to an image reading device 10 according to the present disclosure with reference to FIG. 5. FIG. 5 is an oblique view schematically showing the image reading device 10 according to the embodiment of the present disclosure. The image reading device 10 includes an input device 50 and an image reading section 20. The input device 50 includes a touch panel 53, an operating button 54, and a card information reading section 56. Except for that the input device 50 additionally includes the card information reading section 56, the image reading device 10 shown in FIG. 5 is similar in structure to the image reading device 10 described with reference to FIG. 1A. Therefore, no overlapping descriptions are given.

The card information reading section 56 reads information of a card placed over the card information reading section 56. The card is an IC card, for example. The authentication section 55 authenticates the user based on the first region corresponding to the selected symbol from among the plurality of first regions, the second region selected from among the plurality of second regions, and the information read by the card information reading section 56.

Figure 6:
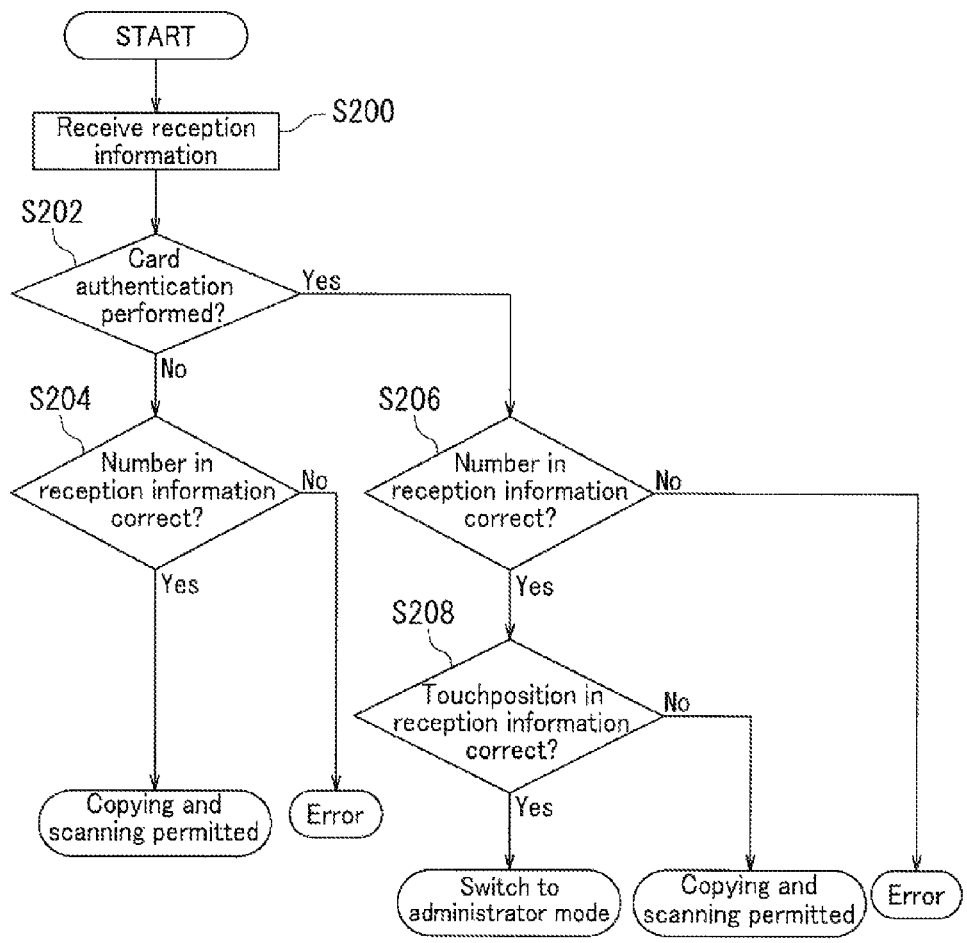
FIG. 6 is a flowchart illustrating an authentication method according to the present disclosure.

The following describes an embodiment directed to an authentication method performed by the image reading device 10 according to the present disclosure, with reference to FIG. 6. FIG. 6 is a flowchart illustrating the authentication method according to the present disclosure. As shown in FIG. 6, the user authentication is performed through Steps S200 to S208.

Step S200: The input section 52 receives reception information. For example, the input section 52 receives as the reception information a four-digit number selected by the user. The input section 52 further receives as the reception information the touch positions where the user touched.

Step S202: The authentication section 55 determines whether or not card authentication has been performed. When the authentication section 55 determines that the card authentication has been performed (Step S202: Yes), the authentication method moves onto Step S206. When the authentication section 55 determines that the card authentication has not been performed (Step S202: No), the authentication method moves onto Step S204.

Step S204: The authentication section 55 determines whether or not the number in the reception information is correct. More specifically, the authentication section 55 determines whether or not the number (numerals) received by the input section 52 is correct. For example, it is determined whether or not the number "0123" in the reception information is correct. When the authentication section 55 determines that the number in the reception information is not correct (Step S204: No), the authentication of the user results in an error, and thus the user is not permitted to use the functions of the image reading device 10. When the authentication section 55 determines that the number in the reception information is correct (Step S204: Yes), the usage of the copying and scanning functions is permitted. As a result, the user can use the copying and scanning functions.

Step S206: The authentication section 55 determines whether or not the number in the reception information is correct. More specifically, the authentication section 55 determines whether or not the number (numerals) received by the input section 52 is correct. For example, it is determined whether or not the number "0123" in the reception information is correct. When the authentication section 55 determines that the number in the reception information is not correct (Step S206: No), the authentication of the user results in an error, and thus the user is not permitted to use the functions of the image reading device 10. When the authentication section 55 determines that the number in the reception information is correct (Step S206: Yes), the authentication method proceeds to Step S208.

Step S208: The authentication section 55 determines whether or not each of the touch positions in the reception information is correct. More specifically, the authentication section 55 determines whether or not each of the touch positions in the reception information is correct based on the second region selected from among the plurality of second regions. When the authentication section 55 determines that all of the touch positions in the reception information are correct (Step S208: Yes), the image reading device 10 switches into an administrator mode in which the setting change that is available only to the administrative user can be made. When the authentication section 55 determines that at least one of the touch positions in the reception information is not correct (Step S208: No), the user is permitted to use the copying and scanning functions of the image reading device 10 but prohibited from changing the settings of the image reading device 10 that is available only to the administrative user.

As has been described with reference to FIGS. 5 and 6, the authentication section 55 of the input device 50 authenticates the user through: the card authentication based on the information read by the card information reading section 56; and the touch authentication based on the position of a touch by the user. The touch authentication involves first authentication and second authentication. The authentication section 55 performs the first authentication of authenticating the user based on the first region corresponding to the selected symbol from among the plurality of first regions. In addition, the authentication section 55 performs the second authentication of authenticating the user based on the first region corresponding to the selected symbol from among the plurality of first regions and the second region selected from among the plurality of second regions. Therefore, the input device 50 can grant the user a usage permission corresponding to the level of authentication.

Also, the authentication section 55 of the input device 50 can authenticate the user based on the first region corresponding to the selected symbol from among the plurality of first regions, the second region selected from among the plurality of second regions, and the information read by the card information reading section 56. By the addition of the authentication with the use of a card, the security can be further increased.

Figure 7A:
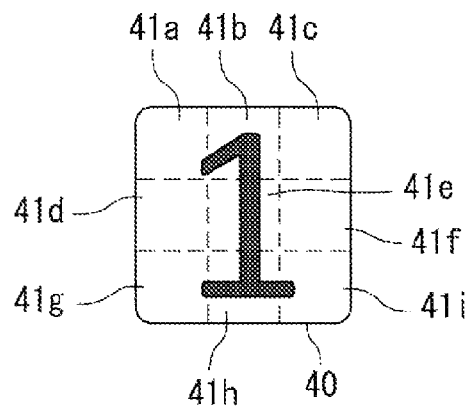
FIGS. 7A-7C are schematic views each showing an example of second regions divided from a first region displaying a symbol.
Figure 7B:
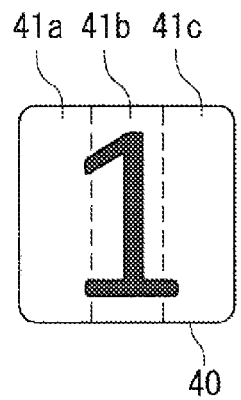
Figure 7C:
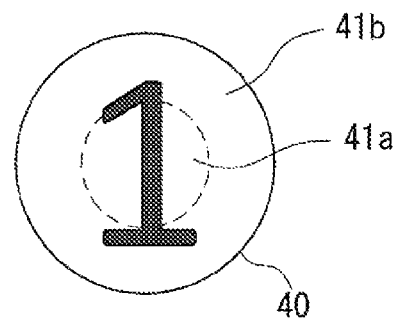

Note that as described with reference to FIGS. 1 to 6, the display section 51 includes the second regions (the second regions 41*a*, 41*b*, 41*c*, and 41*d*) that are defined by dividing each first region 40 into halves vertically as well as horizontally. That is, a total of four second regions are defined for each first region. However, the present disclosure is not limited to such. FIGS. 7A-7C are schematic views each showing an example of second regions divided from a first region 40 displaying a symbol.

As shown in FIG. 7A, each first region 40 may be divided into three regions vertically as well as horizontally to define a total of nine second regions (the second regions 41*a*, 41*b*, 41*c*, 41*d*, 41*e*, 41*f*, 41*g*, 41*h*, and 41*i*).

Alternatively, as shown in FIG. 7B, each first region 40 may be divided into three regions only vertically but not horizontally to define a total of three second regions (second regions 41*a*, 41*b*, and 41*c*).

The display section 51 described with reference to FIGS. 1 to 6 has the first regions 40 each having a rectangle shape, which, however, should not be taken to limit the present disclosure. The first regions 40 may be circular in shape as shown in FIG. 7C. The first region 40 is divided into: a second region 41*a* that is a circular region inside the first region 40; and a second region 41*b* that is an annular region surrounding the second region 41*a*.

The input device 50 described with reference to FIGS. 1 to 7 displays numerals in the respective first regions 40. However, what can be displayed in the first regions 40 is not limited to numerals.

Figure 8:
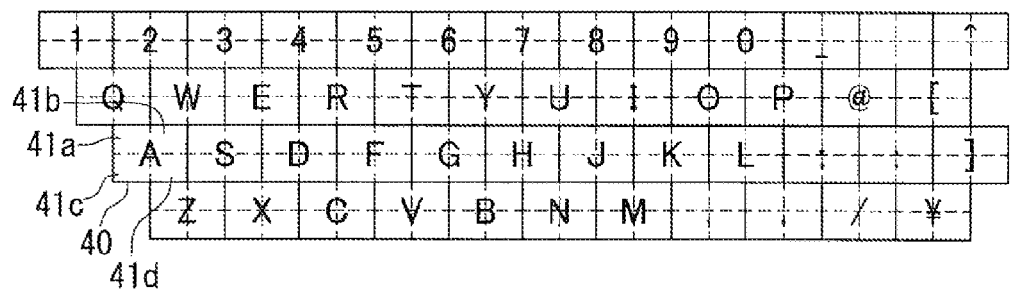
FIG. 8 is a schematic view showing an example of a plurality of first regions displayed on the input device.

FIG. 8 is a schematic illustration of an example of the plurality of first regions displayed on the input device 50. As shown in FIG. 8, the symbols displayed in the respective first regions 40 may include characters (alphabet letters). The authentication section 55 authenticates a user with the use of, for example, a password that is a combination of alphabet letters and numerals.

Figure 9:
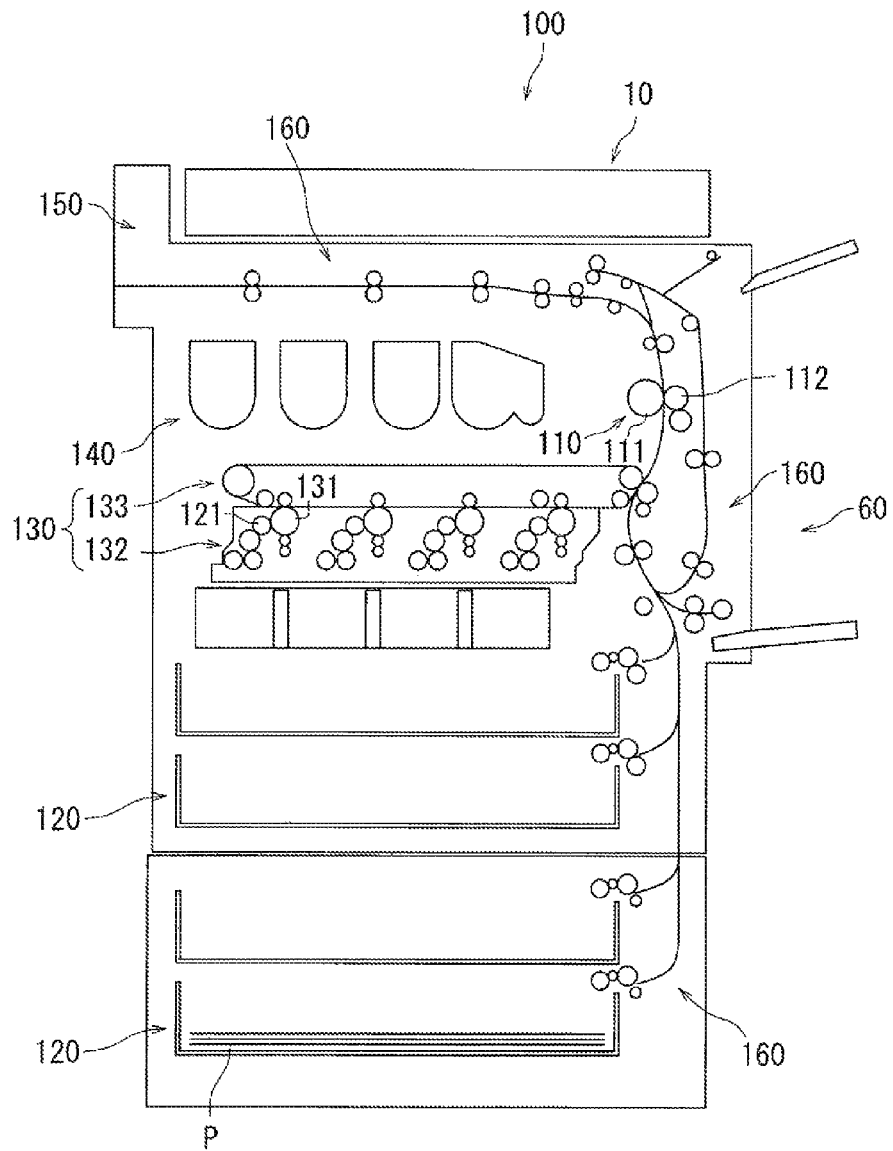
FIG. 9 is a schematic view showing an image forming apparatus according to the embodiment of the present disclosure.

The following describes an embodiment directed to an image forming apparatus 100 according to the present disclosure with reference to FIG. 9. FIG. 9 is a schematic view of the image forming apparatus 100 according to the embodiment of the present disclosure. The image forming apparatus 100 may be a copier, a printer, a facsimile machine, or a multifunction peripheral combining their functions. The following description is given by way of a copier as an example, which, however, should not be taken to limit the present disclosure. The image forming apparatus 100 includes an image reading device 10 and an image forming section 60. The image forming section 60 includes a fixing device 110, a paper feed cassette 120, an imaging section 130, a toner replenishment device 140, a paper discharge section 150, and a paper conveyance section 160. The image forming section 60 forms an image based on image data read by the image reading device 10.

The paper feed cassette 120 stores paper P for printing. At the time of printing, the paper P stored in the paper feed cassette 120 is conveyed by the paper conveyance section 160 sequentially to the imaging section 130 and the fixing device 110 and ultimately discharged from the paper discharge section 150.

The imaging section 130 forms a toner image on the paper P. The imaging section 130 includes a plurality of photosensitive members 131, a plurality of developing devices 132, and a transfer device 133.

An electrostatic latent image is formed on each photosensitive member 131 by a laser scanned based on, for example, an electron signal generated by the image reading device 10 according to a document image. Each developing device 132 includes a developing roller 121. Each developing roller 121 supplies toner to the corresponding photosensitive member 131 to develop the electrostatic latent image. As a result, a toner image is formed on each photosensitive member 131. The toner is supplied form the toner replenishment device 140 to the developing device 132.

The transfer device 133 transfers the toner images formed on the respective photosensitive members 131 to the paper P.

The fixing device 110 fuses an unfixed toner image formed by the imaging section 130, by applying heat and pressure to the paper P by a fixing member 111 and a pressure member 112. As a result, the unfixed toner image is fixed to the paper P.

With reference to FIGS. 1-9, the image reading device 10 or the image forming apparatus 100 that includes the input device 50 have been described. However, this should not be taken to limit the present disclosure. The input device 50 may be included in other devices or apparatuses which involves an input of a personal identification number or a password. For example, the input device 50 may be an automated teller machine (ATM) installed at a financial institution or a smart phone or tablet computer that is provided with a touch panel.

The input section 52 receives reception information in response to a touch on the touch panel by the user, which, however, should not be taken to limit the present disclosure. The reception information may be input by the user with the use of a pointing device. For example, the input section 52 may receive reception information at a click of a mouse on an alphabet letter or numeral displayed on the screen of a personal computer.

What is claimed is:

1. An input device comprising:
    a display section that includes a display area and is configured to display a plurality of symbols in respective first regions of the display area;
    an input section configured to receive an input indicating which of the plurality of symbols displayed on the display section is selected by a user by specifying a position in the display area; and
    an authentication section configured to authenticate the user based on a result received by the input section, wherein
    the input section receives the input indicating which of the plurality of symbols displayed on the display section is selected, by receiving an input indicating one second region selected from among a plurality of second regions allocated to non-overlapping positions in each of the first regions, and
    the authentication section authenticates the user based on the first region corresponding to the selected symbol from among the plurality of first regions and the second region selected from among the plurality of the second regions.

2. An input device according to claim 1, wherein the authentication section performs
    first authentication of authenticating the user based on the first region corresponding to the selected symbol from among the plurality of first regions, and
    second authentication of authenticating the user based on the first region corresponding to the selected symbol from among the plurality of first regions and the second region selected from among the plurality of the second regions.

3. An input device according to claim 1, further comprising:
    a card information reading section configured to read information of a card, wherein
    the authentication section authenticates the user based on the first region corresponding to the selected symbol from among the plurality of first regions, the second region selected from among the plurality of the second regions, and the information read by the card information reading section.

4. An input device according to claim 1, wherein the plurality of second regions allocated to each of the first regions is equally divided regions of the corresponding first region.

5. An input device according to claim 1, wherein the plurality of symbols include a numeral.

6. An input device according to claim 1, wherein the plurality of symbols include a character.

7. An input device according to claim 1, wherein the plurality of second regions are defined by vertically and/or horizontally dividing each of the first regions.

8. An input device according to claim 1, wherein each of the first regions is rectangular or circular in shape.

9. An image reading device comprising:
    an input device according to claim 1; and
    an image reading section configured to read an image of an original document.

10. An image forming apparatus comprising:
    an image reading device according to claim 9; and
    an image forming section configured to form an image based on image data read by the image reading device.

* * * * *